2,711,965

METHOD FOR REMOVING COLOR BODIES FROM AN ETHYL CELLULOSE AND STABILIZING THE SAME

George H. Pyle, Hopewell, Va., assignor to Hercules Powder Company, Wilmington, Del., a corporation of Delaware No Drawing. Application September 20, 1951, Serial No. 247,559

6 Claims. (Cl. 106—189)

This invention relates to the treatment of cellulose derivatives. In a specific aspect this invention relates to the treatment of cellulose ethers. In one of its more specific aspects this invention relates to a process for the removal of color bodies from a cellulose ether by a novel process.

This application is a continuation-in-part of my copending application, Serial No. 226,933, filed May 17, 1951.

Thermoplastic compositions based on ethyl cellulose and similar thermoplastic ethers of cellulose have been found to be useful where the properties of toughness, dimensional stability and flexibility are required. However, when such cellulose ethers have been molded into useful objects at high temperatures, a considerable discoloration of the cellulose ether composition takes place. Thus, compositions depositing a substantially colorless mass from solution have given relatively dark amber masses much like tortoise shell upon being molded under heat. In addition, there has been considerable loss of viscosity, i. e., degradation, leading to brittle molded products.

Some attempts have been made to improve color by treatment with various bleaching agents and by treatment with acids. Where such improvements in color have been retained in the molding operation, they have resulted in such extreme loss of viscosity that a relatively useless product results. As a result, it has not been possible to prepare clear colorless molded products of cellulose ethers or even to prepare molded cellulose ether articles in pale or pastel shades. Molded cellulose ether articles have therefore been made primarily in pigmented or dark colors.

It is an object of this invention to provide a novel process for treating cellulose derivatives.

It is another object of this invention to provide a novel process for treating cellulose ethers.

It is a further object of this invention to provide a novel process for producing colorless cellulose ethers of improved color stability.

It is a further object of this invention to provide a novel process for producing colorless cellulose ethers of low alkaline content and having improved viscosity and color stabilities.

It is another object of this invention to provide novel colorless cellulose ethers.

It is a further object of this invention to provide novel colorless ethyl cellulose of improved color stability and viscosity stability.

In accordance with this invention it has been found that novel color-stable and viscosity-stable cellulose ethers can be prepared by a novel process for removing color bodies from and stabilizing the cellulose ethers. The novel product is produced by treating and thus de-ashing a cellulose ether composition with an aqueous swelling medium that penetrates the granules of and permits diffusion through the cellulose ether composition. Subsequently the cellulose ether composition is stabilized with a phenolic stabilization agent in the presence of aqueous swelling medium, and the resulting product, upon drying, is a colorless and color-stable cellulose ether.

The following examples are illustrative of this invention.

Example 1

To 5000 ml. of aqueous 35% isopropanol was added 1:1 hydrochloric acid in an amount sufficient to produce a pH of 2.2. The dilute isopropanol was prepared from distilled isopropanol and distilled water. To the acidified aqueous alcohol was added 681 grams of ethyl cellulose. The ethyl cellulose contained 46.5% ethoxyl groups and when dissolved in a solvent consisting of 80 parts toluene and 20 parts ethanol, to give a 5% solution, the solution possessed a viscosity of 97 cps. at 25° C. The mixture of ethyl cellulose, swelling medium and acid was heated to 75° C. and maintained at this temperature for 1.5 hours, and then the liquor was drained off. The volume was restored by the addition of 4000 ml. of fresh 35% isopropanol. After 0.5 hour the liquor was drained off again. The volume was restored with 4000 ml. of fresh 35% isopropanol. This procedure was repeated three more times to wash the ethyl cellulose free of salts and the excess acid. Then to the last wash was added 5 grams of di-tert-amylphenol dissolved in 25 ml. of 35% isopropanol. The liquor was drained off and the material was vacuum dried.

The ethyl cellulose then was tested for plastics color stability by preparing a molding powder with the use of a two-roll mill with roll temperatures of 280° F. to 310° F. and rolling time of 20 minutes. The formulation consisted of ethyl cellulose, a methyl styrene plasticizer, and diisobutyl phenol in the ratio of 85:15:2. The colloided plastic was cut into pellets, dried for 2 hours at 100° C., and then injection molded at 410° F. into plastics disks with the use of a 1-ounce injection molding machine. The injection molded disks were 2¼ inches in diameter and 0.180 inch in thickness. The color or chromaticity and clarity or haze of the disks were measured with a photoelectric filter photometer. Apparatus suitable for measuring color or chromaticity is described by R. H. Osborn in U. S. Patent 2,382,439, and a similar device modified to permit the clarity measurements was used to measure the color and clarity of the treated and untreated ethyl cellulose. The color measurements are expressed in Cellulose Products Standard Color Scale (CSCS) units and the clarity is expressed in per cent haze. The color and clarity of air are zero with this measuring device, and the ethyl cellulose samples having the lowest color and per cent haze are the most desirable. The following data were observed:

|  | Color | Percent Haze |
|---|---|---|
| Ethyl cellulose product | 4.3 | 5.1 |
| Untreated ethyl cellulose | 18 | 9 |

Example 2

To 5000 ml. of aqueous 35% isopropanol was added 5 ml. 1:1 hydrochloric acid. The dilute isopropanol was prepared from distilled isopropanol and distilled water. To the acidified aqueous alcohol was added 681 grams ethyl cellulose. The pH of the mixture was 3.0. The ethyl cellulose contained 47.0% ethoxyl groups, and when dissolved in a solvent consisting of 80 parts toluene and 20 parts ethanol, to give a 5% solution, the solution possessed a viscosity of 41 cps. at 25° C. The mixture of ethyl cellulose, swelling medium and acid was allowed to stand for 16 hours at room temperature. Then the liquor was drained off. The volume was restored by the addition of 4000 ml. fresh 35% isopropanol. After 0.5 hour the liquor was drained off again. This procedure was repeated two more times to wash the ethyl cellulose free of excess salts and the excess acid. To the last wash was added 5 grams di-tert-amylphenol dissolved in 200 ml. 35% isopropanol. After one hour the liquor from the last wash was drained off and the material was vacuum dried. The following data were observed in examining the treated and untreated ethyl cellulose as described in Example 1:

|  | Color | Percent Haze |
|---|---|---|
| Ethyl cellulose product | 6.8 | 19 |
| Untreated ethyl cellulose | 14 | 22 |

*Example 3*

To 5000 ml. of aqueous 35% isopropanol was added 12 ml. 1:1 hydrochloric acid. The dilute isopropanol was prepared from distilled isopropanol and distilled water. To the acidified aqueous alcohol was added 681 grams of ethyl cellulose. The pH of the mixture was 2.2. The ethyl cellulose contained 45.5% ethoxyl groups, and when dissolved in a solvent consisting of 80 parts toluene and 20 parts ethanol, to give a 5% solution, the solution possessed a viscosity of 94 cps. at 25° C. The mixture of ethyl cellulose, swelling medium and acid was heated to 75° C. The mixture was maintained at 75° C. for 1.5 hours. Then the liquor was drained off. The volume was restored by the addition of 4000 ml. of 35% isopropanol. After 0.5 hour the liquor was drained off again. The volume was restored with 3000 ml. fresh 35% isopropanol. This procedure was repeated seven more times to wash the ethyl cellulose free of the salts and the excess acid. Then to the last wash was added 5 grams di-tert-amylphenol dissolved in 25 ml. 35% isopropanol. The liquor was drained off and the material was vacuum dried. The following data were observed in examining the treated and untreated ethyl cellulose as described in Example 1:

|  | Color | Percent Haze |
|---|---|---|
| Ethyl cellulose product | 6.5 | 5.3 |
| Untreated ethyl cellulose | 17 | 8 |

*Example 4*

To 5000 ml. of aqueous 35% isopropanol was added 12 ml. 1:1 hydrochloric acid. The dilute isopropanol was prepared from distilled isopropanol and distilled water. To the acidified aqueous alcohol was added 681 grams ethyl cellulose. The pH of the mixture was 2.3. The ethyl cellulose contained 45.9% ethoxyl groups, and when dissolved in a solvent consisting of 80 parts toluene and 20 parts ethanol, to give a 5% solution, the solution possessed a viscosity of 65 cps. at 25° C. The mixture of ethyl cellulose, swelling medium and acid was heated to 75° C. The mixture was maintained at 75° C for 1.5 hours. Then the liquor was drained off. The volume was restored by the addition of 4000 ml. fresh 35% isopropanol. After 0.5 hour the liquor was drained off again. This procedure was repeated three more times. On the fifth wash only 3500 ml. of the liquor was drained off. The volume was restored by the addition of 3500 ml. fresh 35% isopropanol. After 0.5 hour 3000 ml. of the liquor was drained off. The volume was restored by the addition of 3000 ml. 35% isopropanol. After 0.5 hour 2500 ml. of the liquor was drained off. The volume was restored by the addition of 2500 ml. 35% isopropanol. After 0.5 hour the liquor was drained off. This procedure was repeated two more times to wash the ethyl cellulose free of the salts and the excess acid. Then to the last wash was added 5 grams di-tert-amylphenol dissolved in 25 ml. 35% isopropanol. The liquor was drained off and the material was vacuum dried. The following data were observed in examining the treated and untreated ethyl cellulose as described in Example 1:

|  | Color | Percent Haze |
|---|---|---|
| Ethyl cellulose product | 4.9 | 6.1 |
| Untreated ethyl cellulose | 18 | 8.5 |

The cellulose ethers that are employed in practicing this invention are organic solvent-soluble, i. e., they are soluble in any of the common organic solvents such as acetone, benzene, toluene-alcohol, methanol, ethanol, ethyl acetate, butyl acetate, and the like. The primary factor that determines whether or not a cellulose ether is organic solvent-soluble is the degree of substitution of the cellulose ether, and the extent of etherification necessary to produce an organic solvent-soluble cellulose ether is known to those skilled in the art. For example, ethyl cellulose having an ethoxyl content between about 37% and about 52%, preferably between about 43% and about 48%, and having a viscosity of at least 20 cps., is particularly suitable. One method of preparing such an ethyl cellulose involves the preparation of an alkali cellulose by contacting a cellulosic material with strong caustic. The resulting alkali cellulose is treated in an autoclave under pressure with an excess of ethyl chloride and the resulting mixture is then distilled to remove ether and alcohol by-products as well as unreacted ethyl chloride. The resulting ethyl cellulose is then water-washed. In addition to ethyl cellulose, other cellulose ethers can be treated in accordance with this invention. For example, the process is applicable to the bleaching of propyl cellulose, ethyl propyl cellulose, ethyl butyl cellulose, methyl ethyl cellulose, benzyl cellulose, and the like.

In addition to the alkyl and aralkyl cellulose ethers described above, the invention is generally applicable to organic solvent-soluble cellulose ethers. For example, ethyl hydroxyethyl cellulose can be treated in accordance with the invention to produce a color-free, color-stable product. Also ether-ester derivatives of cellulose can be treated in accordance with this process, but in these ether-ester derivatives the ether grouping is the dominant substituent and the ester grouping is present only in a minor amount. However, the degree of substitution of the ether-ester derivative is such that the derivative is soluble in the organic solvents named above. Throughout the specification and claims the term "cellulose ether" will be employed in the description of the invention. It will be understood that this term includes those ether-ester cellulose derivatives wherein the ether substituent is the dominant substituent and the ester substituent is present only in a minor amount as well as unesterified cellulose ethers.

Various aqueous media can be used to effect the desired swelling of the cellulose ether. For example, the swelling of the cellulose ether can be effected by aqueous digestion of the ether at an elevated temperature and pressure. Long steeping of the cellulose ether in water at 0° to 3° C. also will produce swelling. Preferably the swelling is effected in the presence of an aqueous solution of an organic solvent for the ether, the concentration of the solution being such that the cellulose ether is substantially insoluble in the solution. Organic solvents that can be used are acetone, dioxane, tetrahydrofuran, methyl acetate, ethyl acetate, and the like. The preferred organic solvents are the lower water-miscible aliphatic alcohols, for example, methanol, ethanol, propanol, isopropanol, and the like, with isopropanol being the most preferred organic solvent. In general, the aqueous solution of the organic solvent will contain from 10% to 50% by weight of the organic solvent. When isopropanol is the organic solvent, a concentration of 30% to 35% by weight is preferred, and when ethanol is used, the preferred concentration is within the range of 40% to 50% by weight. The treatment of the cellulose ether with the aqueous swelling medium results in a penetration of the ether granules by the swelling medium and in a deashing of the ether to remove inorganic constituents, such as alkaline metals, attached to functional groups in the cellulose ether and such impurities as iron, copper and low molecular weight organic materials. For effective deashing, a swelling medium which has been acidified until the pH is substantially below 6 and preferably within the range of 1.5 to 3.5 is employed. A pH higher than 3.5 can be used, but poor deashing of the cellulose ether results, and at a pH lower than 1.5 the cellulose ether has a tendency to degrade.

In general, the deashing of the cellulose ether is carried out at room temperature, but, if desired, elevated temperatures of 75° C. and higher can be used. The contact time for the deashing step is variable, but a contact time within the range of 0.25 to 5.0 hours is preferred to effect the desired deashing of the cellulose ether. However, a contact time up to 20 hours and longer can be used, if desired. In Example 2 a contact time of 16 hours was employed.

Various acidic materials can be employed to effect the desired pH adjustment in the deashing operation. For this pH adjustment the inorganic acids are preferred, and the most preferred acids are the strong mineral acids such as hydrochloric acid, sulfuric acid, and nitric acid.

After the desired deashing of the cellulose ether has been effected, the cellulose ether is separated and recovered from the resulting mixture. Suitable methods of recovering the cellulose ether are centrifuging, filtration, decantation or draining the solid cellulose ether from the accompanying liquid. The recovered cellulose ether is then washed with either water or additional amounts of aqueous swelling medium. The latter is preferred for the washing operation, and a series of washing steps is usually necessary in order to effect the removal of salts, excess acid and undesirable low molecular weight degraded cellulosic material. The washing is continued and it is considered complete when the pH of the effluent liquor from the washing step has a pH within the range of 4.2 to 4.8. Further washing of the cellulose ether may be used, but in most instances such further washing is not necessary. The resulting cellulose ether is substantially free of alkaline constituents and has an ash content not in excess of 0.02% by weight.

The cellulose ether resulting from the deashing operation is subject to rapid oxidation and depolymerization upon exposure to heat unless properly stabilized. Therefore, during washing of the bleached cellulose ether with aqueous swelling medium, a phenolic stabilizer is added to the cellulose ether in the last wash. Various phenols are suitable for effecting the desired stabilization of the deashed cellulose ether. Among these stabilizers are p-sec-amylphenol, di-sec-amylphenol, o-sec-amylphenol, p-cyclohexylphenol, diisobutylphenol, p-tert-amylphenol, menthylphenol, tert-butyl-p-cresol, methylene bis(tert-butyl-p-cresol), methylene bis-p-cresol, di(hydroxy methyl phenyl) methyl-p-cresol, and the like. In the specific examples di-tert-amylphenol was employed as a stabilizer. The amount of phenolic stabilizer employed to effect the desired stabilization is within the range of 0.5% to 1% by weight based on the cellulose ether. As indicated above, the phenolic stabilizer can be dissolved in the swelling medium that is employed as the last washing medium for the deashed cellulose ether, or alternatively a solution or dispersion of the phenolic stabilizer can be added to the mixture while the deashed cellulose ether is undergoing its last wash with swelling medium.

After deashing and stabilizing the cellulose ether, the resulting cellulose ether is recovered by draining off the last wash liquid and drying the recovered cellulose ether. This cellulose ether can be processed into plastics products lighter in color than those possible heretofore. Also, a wide range of dyes can be used with this cellulose ether, and the resulting products are essentially free from odor. Prior to using the cellulose ether resulting from this process in a molding operation, it is preferred to add additional quantities of phenolic stabilizer in order to prevent oxidation or depolymerization of the ether. Preferably the resulting product contains from 1% to 3% by weight of phenolic stabilizer based upon the cellulose ether.

What I claim and desire to protect by Letters Patent is:

1. The method for removing color bodies from an ethyl cellulose and for producing a color-stable, viscosity-stable product which comprises contacting an organic solvent-soluble ethyl cellulose containing sodium attached to functional groups in said ethyl cellulose with an aqueous solution of a lower aliphatic alcohol containing from 10 to 50 weight per cent of said alcohol and acidified to a pH within the range of 1.5 to 3.5 with a strong mineral acid, washing resulting ethyl cellulose with an unacidified aqueous solution of a lower aliphatic alcohol containing from 10 to 50 weight per cent of said alcohol in a plurality of washing steps, and in the final washing step adding a phenolic stabilizing agent to the unacidified aqueous solution to stabilize the ethyl cellulose against discoloration and viscosity reduction.

2. The method according to claim 1 wherein the plurality of washing steps is effected until the aqueous washing solution has a pH of 4.2 to 4.8.

3. The method according to claim 1 wherein isoproponal is the lower aliphatic alcohol.

4. The method according to claim 1 wherein the phenolic stabilizing agent is di-tert-amylphenol.

5. The method for removing color bodies from a cellulose ether and for producing a color-stable, viscosity-stable product which comprises contacting an organic solvent-soluble cellulose ether containing alkaline metal attached to functional groups in said cellulose ether with an acidified aqueous swelling medium for said cellulose ether, said swelling medium containing an organic solvent having only carbon, hydrogen and oxygen atoms, washing resulting cellulose ether with unacidified aqueous swelling medium, and stabilizing resulting cellulose ether during said washing step against discoloration and viscosity reduction with a phenolic stabilizing agent.

6. The method for removing color bodies from an ethyl cellulose and for producing a color-stable, viscosity-stable product which comprises contacting an organic solvent-soluble ethyl cellulose containing sodium attached to functional groups in said ethyl cellulose with an unacidified aqueous swelling medium for said ethyl cellulose, said swelling medium containing an organic solvent having only carbon, hydrogen and oxygen atoms, washing resulting ethyl cellulose with unacidified aqueous swelling medium in a plurality of washing steps, and in the final washing step adding a phenolic stabilizing agent to the unacidified aqueous swelling medium to stabilize the ethyl cellulose against discoloration and viscosity reduction.

References Cited in the file of this patent

UNITED STATES PATENTS

| Number | Name | Date |
| --- | --- | --- |
| 2,389,370 | Koch | Nov. 20, 1945 |
| 2,407,209 | Swan et al. | Sept. 3, 1946 |
| 2,472,227 | Paist | June 7, 1949 |
| 2,535,357 | Gloor | Dec. 26, 1950 |
| 2,535,362 | Koch | Dec. 29, 1950 |